(12) United States Patent
South

(10) Patent No.: US 6,616,558 B2
(45) Date of Patent: Sep. 9, 2003

(54) POWER TRANSMISSION BELT HAVING HIGH MODULUS ADHESIVE RUBBER MEMBER

(75) Inventor: Bobbie E. South, Littleton, CO (US)

(73) Assignee: The Gates Corporation, Denver, CO (US)

(*) Notice: Subject to any disclaimer, the term of this patent is extended or adjusted under 35 U.S.C. 154(b) by 0 days.

(21) Appl. No.: 09/932,746

(22) Filed: Aug. 17, 2001

(65) Prior Publication Data

US 2002/0042317 A1 Apr. 11, 2002

Related U.S. Application Data

(60) Provisional application No. 60/226,138, filed on Aug. 18, 2000.

(51) Int. Cl.$^7$ .............................. F16G 1/06; F16G 5/04; F16G 5/20; F16G 1/00

(52) U.S. Cl. ........................................ 474/260; 156/137

(58) Field of Search .................................. 474/264, 205, 474/263, 260, 202, 271, 265, 237, 191; 525/133, 132, 494, 240, 145, 244, 380; 156/446, 137, 138, 447, 472, 473

(56) References Cited

U.S. PATENT DOCUMENTS

| 4,415,397 A | * | 11/1983 | Wetzel ........................ 156/446 |
| 5,171,789 A | * | 12/1992 | Wideman et al. ............ 525/132 |
| 5,501,908 A | | 3/1996 | Shioyama et al. |
| 5,610,217 A | * | 3/1997 | Yarnell et al. ............... 474/264 |
| 6,207,754 B1 | * | 3/2001 | Yu ............................... 525/133 |
| 6,419,775 B1 | * | 7/2002 | Gibson et al. ............... 474/205 |

FOREIGN PATENT DOCUMENTS

| EP | 0 625 650 A1 | 5/1994 |
| EP | 0 776 938 A2 | 11/1996 |

* cited by examiner

Primary Examiner—Marcus Charles
(74) Attorney, Agent, or Firm—M. S. Olson, Esq.; C. H. Castleman, Esq.; S. G. Austin, Esq.

(57) ABSTRACT

Power transmission belts, including V-belts, synchronous belts and multi-V-ribbed belts, comprising an elastomeric belt body portion and a load-carrying section embedded therein and extending in the longitudinal direction of the belt; the load-carrying section comprising a tensile member disposed in an adhesive rubber member, wherein at least one of said elastomeric belt body portion and said adhesive rubber member exhibits at least one of a complex modulus measured at 175° C., at 2000.0 cpm and at a strain of 0.09 degrees, of at least 15,000 kPa; and a tensile modulus, measur and 10% elongation, of at least 250 psi (1.724 MPa).

22 Claims, 2 Drawing Sheets

POWER TRANSMISSION BELT HAVING HIGH MODULUS ADHESIVE RUBBER MEMBER

CROSS-REFERENCE TO RELATED APPLICATIONS

This application claims the benefit of U.S. Provisional Application No. 60/226,138, filed Aug. 18 2000.

BACKGROUND OF THE INVENTION

1. Field of the Invention

The present invention is directed to endless belts, including endless V-belts, endless multi-V-ribbed belts and synchronous belts.

2. Description of Related Art

V-belts and multi-V-ribbed belts in particular are conventionally employed for the transmission of peripheral forces in drive systems. Conventional belts comprise a flexible, generally elastomeric main belt body portion defining an undercord- or compression section, an overcord- or tension section and a tensile- or load-carrying section disposed between the undercord and overcord sections. The load-carrying section in turn generally comprises a longitudinally extending highly resilient tensile member typically formed of one or more cords, which is conventionally embedded in or surrounded by an adhesive- or gum rubber composition generally formed from one or more rubber plies or layers.

The frictional engagement between the belt drive surfaces and the drive pulleys or sheaves is generated by the surface of the belt body undercord, with the drive load being borne by the tensile member. The purpose of the adhesive gum is to hold the tensile member in place within the composite belt structure, thus high adhesion and tear strength properties are generally required of these compositions.

In order to provide requisite tear strength properties, it is conventional practice to utilize in forming adhesive gum members a rubber composition characterized by relatively low cross-link density and/or relatively low modulus. Decreasing the cross-link density of a given rubber gum composition generally results in improved tear strength, and also results in a generally proportional decrease in its modulus. A problem exhibited by multi-V-ribbed belts and particularly those operated within high load drives is that of edgecord failure, wherein at least a portion of the tensile cord exposed at the lateral edge of the belt breaks free of the adhesive gum member during operation. This belt failure mode is particularly troublesome since its first sign or indication is frequently catastrophic failure of the belt. From a maintenance perspective, those failure modes exhibiting some early indication of the onset of a potential problem and hence allow for remedial action prior to catastrophic failure, are generally favored over failures as exemplified by edgecord failure.

Increased operational safety- and maintenance requirements of belt drives have led to an increased demand for disturbance-free belts, including V-belts and multi-V-ribbed belts, having a long and predictable service lifespan.

It would be advantageous to provide endless belts, including V-belts and multi-V-ribbed belts and synchronous belts, that exhibit an increased, generally predictable service lifespan, and an improved load-carrying capability compared to belts of the prior art, and particularly such belts which may be suitable for use in high dynamic loading conditions exemplified by contemporary automotive accessory drive applications.

SUMMARY OF THE INVENTION

The present invention provides an endless belt comprising a cured rubber composition in contact with at least a portion of a longitudinally-extending tensile member, exhibiting at least one of a complex modulus of at least 15,000 kPa as measured at a temperature of 175° C., a strain of 0.09 degrees and a frequency of 2000 cpm; and a tensile modulus at 125° C. and 10% elongation of at least 250 pounds per square inch ("psi,") (1.724 MPa).

BRIEF DESCRIPTION OF THE DRAWINGS

The accompanying drawings, which are incorporated in and form a part of the specification, illustrate preferred embodiments of the invention, and together with the description, serve to explain the principles of the invention. In the drawings, like numerals denote like parts and.

DETAILED DESCRIPTION

Figure 1:
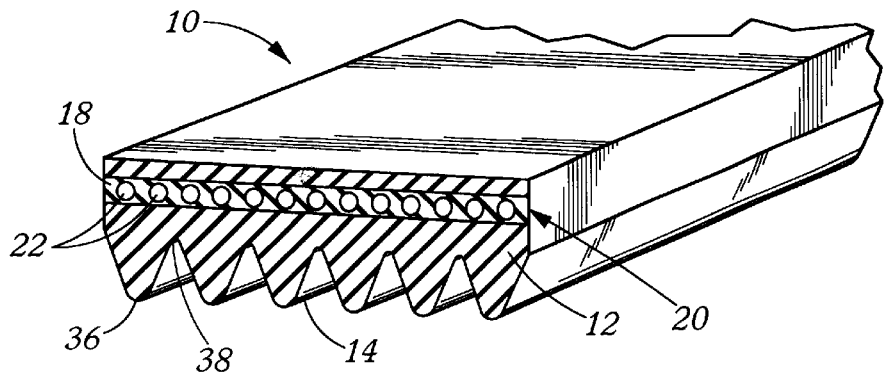
FIG. 1 is a perspective view, with parts in section, of a portion of a multi-V-ribbed belt constructed in accordance with an embodiment of the present invention.

Referring to FIG. 1, a multi-V-ribbed belt 10 in accordance with an embodiment of the present invention is shown generally. The multi-V-ribbed belt 10 includes an elastomeric main belt body portion 12, or undercord, and a sheave contact portion 14 positioned along the inner periphery of the main belt body portion 12. The word, "sheave" as used in this context includes normal pulleys and sprockets used with power transmission belt, and also rollers and like mechanisms. The particular sheave contact portion 14 of the belt of FIG. 1 is in the form of a plurality of raised areas or apexes 36 alternating with a plurality of trough areas 38 defining therebetween oppositely facing sides. In each of the instances of FIGS. 1–2, the sheave contact portion 14 is integral with the main belt body portion 12 and is formed from the same elastomeric material as described below. In FIG. 3 however, the sheave contact portion 14 can be seen to comprise a reinforcing fabric 24, explained in further detail below, as conventionally utilized in synchronous belt building configurations, and is thus formed of a material other than that of the main belt body portion 12 in that embodiment of the present invention.

A tensile- or load-carrying section 20 is positioned above the undercord or main belt body portion 12 for providing support and strength to the belt 10. In the present context, the terms "main belt body portion" and "undercord" shall be utilized interchangeably to denote the same constituent of the belts as indicated as the main belt body portion 12 in FIGS. 1–3 in accordance with the present invention. In the illustrated form the tensile section comprises at least one longitudinally extending tensile cord 22 aligned longitudinally along the length of the belt, and in accordance with an embodiment of the present invention embedded in an adhesive rubber member 18 described in further detail below. The skilled practitioner would readily appreciate that in the several FIGS. 1–3, the adhesive rubber member 18 is illustrated in exaggerated form in order to visually distinguish it from the other elastomeric portions of the belt. In actuality, the cured composite is frequently visually indistinguishable from the surrounding elastomeric belt body portion except in cases, e.g., where one and not the other of the adhesive rubber member 18 and the undercord 12 is fiber loaded.

A reinforcing fabric (not shown in FIG. 1) may optionally be utilized and in the case of V-belts and multi-V-ribbed belts intimately fits along the surface of the belt opposite the sheave contact portion 14 to form a face cover or overcord for the belt. The fabric may be of any desired configuration such as a conventional weave consisting of warp and weft threads at any desired angle, or may consist of warp threads held together by spaced pick cords as exemplified by tire cord fabric, or of a knitted or braided configuration, and the like. The fabric may be friction- or skim-coated with the same or different elastomer composition as that of the elastomeric main belt body 12. More than one ply of fabric may be employed. If desired, the fabric may be cut or otherwise formed to be arranged on a bias so that the strands form an angle with the direction of travel of the belt. One embodiment of such reinforcing fabric use is shown in FIG. 2 wherein a rubber-skim coated tire cord fabric 38, is illustrated in exaggerated form.

Figure 2:
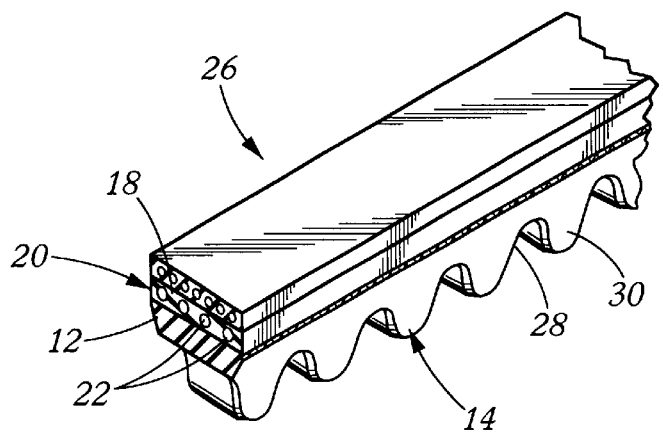
FIG. 2 is a perspective view, with parts in section, of a portion of a V-belt constructed in accordance with another embodiment of the present invention.
Figure 3:
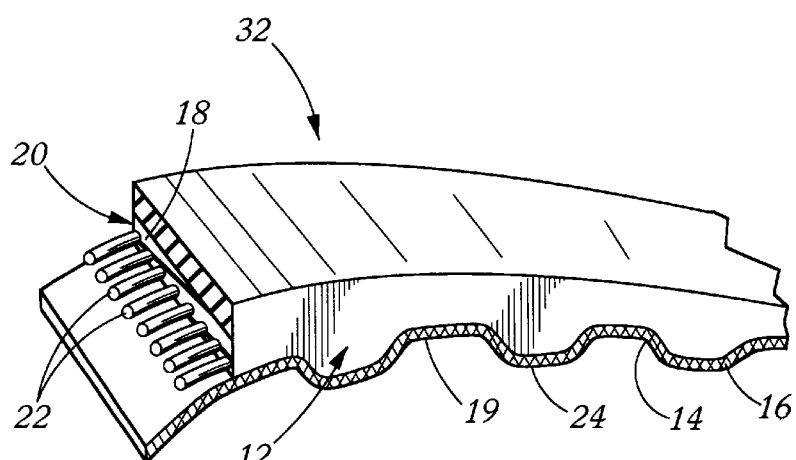
FIG. 3 is a perspective view, with parts in section, of a portion of a synchronous belt constructed in accordance with another embodiment of the present invention.

Referring to FIG. 2, a standard notched V-belt 26 is illustrated. The V-belt 26 includes a main elastomeric belt body portion 12 similar to that illustrated in FIG. 1, and a tensile- or load-carrying section 20 in the form of one or more tensile cords 22 embedded in an adhesive rubber member 18, also similar to that illustrated in FIG. 1. The main elastomeric belt body portion 12, adhesive rubber member 18 and load-carrying section 20 of the V-belt 26 may be constructed from the same materials as described above for FIG. 1.

The V-belt 26 also includes a sheave contact portion 14 as in the multi-V-ribbed belt 10 of FIG. 1. The side surfaces of the elastomeric main belt body portion 12, or in the case of a V-belt as illustrated, of the compression section, serve as the driving surfaces of the belt 26. In the embodiment illustrated, the sheave contact portion 14 is in the form of alternating notch depression surfaces or troughs 28 and toothed projections 30. These alternating depression surfaces 28 and projections 30 may preferably follow a generally sinusoidal path as illustrated which serves to distribute and minimize bending stresses as the sheave contact portion 14 passes around pulleys during operation.

While in the illustrated embodiment, the V-belt 26 is in the form of a raw-edged belt, a reinforcing fabric 38 as described above may moreover be employed, either on the surface opposite the sheave contact surface 14 as shown, or fully encompassing the belt to form a banded V-belt.

Referring to FIG. 3, a synchronous belt 32 is illustrated. The synchronous belt 32 includes a main elastomeric belt body portion 12 and sheave contact portion 14 as in the case of the belts of FIGS. 1 and 2, and also includes a load-carrying section 20 as previously described for the belts of FIGS. 1 and 2. For the synchronous belt 32 however, the sheave contact portion 14 is in the form of alternating teeth 16 and land portion 19. A reinforcing fabric 24 as furthermore described above for the belts of FIGS. 1 and 2 may also be utilized and in this case intimately fits along the alternating teeth 16 and land portion 19 of the belt 32 to form a face cover therefor.

In each of the cases of FIGS. 1–3 shown above, the main belt body portion 12 may be formed of any conventional and/or suitable cured elastomer composition, or may be formed of the elastomer composition described in further detail below in relation to the adhesive rubber member 18. Suitable elastomers that may be utilized for this purpose include for example polychloroprene rubber (CR), acrylonitrile butadiene rubber (NBR), hydrogenated NBR (HNBR), styrene-butadiene rubber (SBR), alkylated chlorosulfonated polyethylene (ACSM), epichlorohydrin, polybutadiene rubber (BR), natural rubber (NR), and ethylene alpha olefin elastomers such as ethylene propylene copolymers (EPM), and ethylene propylene diene terpolymers (EPDM), ethylene octene copolymers (EOM), ethylene butene copolymers (EBM), ethylene octene terpolymers (EODM); ethylene butene terpolymers (EBDM); and silicone rubber, or a combinations of any two or more of the foregoing.

To form the elastomeric belt body portion 12 in accordance with an embodiment of the present invention, the elastomer(s) may be blended with conventional rubber compounding ingredients including fillers, plasticizers, vulcanization agents/curatives and accelerators, in amounts conventionally employed. One skilled in the relevant art would readily appreciate any number of such compositions. A number of suitable elastomer compositions are described for example in The R. T. Vanderbilt Rubber Handbook (13$^{th}$ ed., 1996), and with respect to EPM or EPDM compositions, are furthermore set forth in U.S. Pat. No. 5,610,217, the contents of which, with respect to elastomer compositions suitable for use in the formation of power transmission belt body portions, are specifically incorporated herein by reference. In an embodiment associated with automotive accessory drive applications the elastomeric belt body portions 12 are formed of a suitable ethylene alpha olefin composition, such as an EPM, EPDM, EBM or EOM composition, which may be the same or different composition as that employed as the adhesive rubber member composition, described in further detail below.

The elastomeric main belt body portion 12 may moreover be loaded with discontinuous fibers as is well known in the art, utilizing materials such including but not limited to cotton, polyester, fiberglass, aramid and nylon, in such forms as staple- or chopped fibers, flock or pulp, in amounts generally employed. In a preferred embodiment relating to profiled (e.g., as by cutting or grinding) multi-v-ribbed belts, such fiber loading is preferably formed and arranged such that a substantial portion of the fibers are formed and arranged to lie in a direction generally transverse the direction of travel of the belt. In molded multi-v-ribbed belts and/or synchronous belts made according to flow through methods however, the fiber loading would generally lack the same degree of orientation.

The tensile member 22 of the load-carrying section 20 may similarly be formed of any suitable and/or conventional material, including cotton, rayon, aramid, nylon (including nylon 4/6 and nylon 6/6), polyester, fiberglass, carbon fiber, polyimide, steel etc. It may be of any suitable and/or conventional form, including braid, wire, cord, or even of oriented discontinuous fibers etc. In a preferred embodiment, the tensile member is formed of one or more polyester or aramid cords helically wrapped and generally embedded in the adhesive rubber member 18, and extending longitudinally, i.e., in the direction of travel of the belt.

Figure 4:
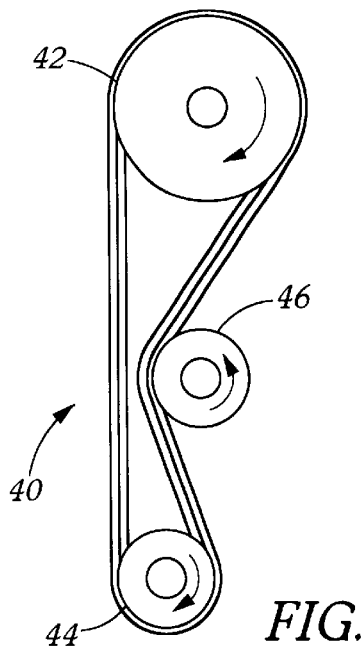
FIG. 4 is a schematic perspective view of the belt of FIG. 1 trained about two pulleys in a drive assembly according to yet another embodiment of the present invention.

In operation, the belt, as shown for example in FIGS. 1–3, is generally trained about at least one driver pulley 42 and one driven pulley 44 as shown for example schematically in FIG. 4, to form a belt drive 40, optionally in combination with an idler pulley 46 as shown.

Turning now to a description of the elastomer composition in accordance with an embodiment of the present invention for utilization in at least partial contact with the tensile member within the composite belt structure as described in several embodiments above for FIGS. 1–3, such cured composition exhibits at least one of a complex modulus of at least 15,000 kPa, more preferably of from about 25,000 to about 100,000 kPa, more preferably of from about 35,000 to about 75,000 kPa, and most preferably of from about 40,000 to about 60,000 kPa, as measured at a temperature of 175° C., at a strain of 0.09 degrees, and a frequency of 2000 cycles per minute ("cpm"); and a tensile modulus as measured at 125° C. and at a cross-head speed of 6 in./min (15.24 cm/min), of at least about 250 psi (1.724 MPa), more preferably of from about 300 psi (2.068 MPa) to about 5000 psi (34.47 MPa), and most preferably of from about 350 p(2.413 MPa) to about 3000 psi (20.68 MPa). In the present context, the term "complex modulus" is used to describe the complex modulus, conventionally described by the term, "G*", of a composition as determined via dynamic mechanical rheological analysis, which may be performed utilizing appropriate apparatus exemplified by the Rubber Process Analyzer, Model No. 2000 by Monsanto Corporation of St. Louis, Mo. Tensile modulus for purposes of the present invention is measured utilizing the parameters described above, and in accordance with ASTM D412. It has been surprisingly found in accordance with an embodiment of the present invention, that a multi-v-ribbed belt comprising an adhesive rubber member formed of a cured elastomer composition exhibiting a high modulus as provided in accordance with the present invention is nonetheless capable of maintaining adequate overall flexibility to allow for long-term operation within the increasingly compact, serpentine automotive accessory drive applications now regularly utilized by automotive original equipment manufacturers. While not wishing to be limited to a particular theory, it is presently believed that the incorporation of a high modulus adhesive rubber member within the belt according to the present invention serves to redistribute the stress induced within the composite belt structure with the application of load.

As load is applied to a composite structure, it is translated into shear strain within that structure; this strain tends to be concentrated, in conventional constructions, at the interface of the very high modulus tensile cord and the belt composite member directly adjacent thereto, e.g., the much lower modulus adhesive rubber member in which the cord is embedded, since the lower modulus component will strain preferentially in relation to the higher modulus component. As noted above, the relevant composite structure according to the present invention generally comprises a very high modulus tensile cord which serves as the load bearing component of the composite, embedded in an adhesive rubber member exhibiting a modulus less than or equal to that of the tensile cord, which in turn is bonded to an undercord (i.e., belt body portion) composition exhibiting a lower modulus than that of the adhesive rubber member.

While not intending to be limited to any particular theory, it is presently believed that by significantly increasing the modulus of the adhesive rubber member over that of the undercord in accordance with an embodiment of the present invention, one allows for the transmission of a greater portion of the strain imposed on the tensile cord during belt operation through the adhesive rubber member and into the low modulus undercord, thereby shifting at least a substantial portion thereof away from the adhesive rubber member-tensile cord interface. In so doing it is believed that the strain energy is diffused into a larger area within the belt composite structure. By decreasing the concentration of strain in the area of the adhesive rubber member-tensile cord interface, it is believed that one reduces the potential for cracking, tearing, and other load-induced failures in this area, and thus correspondingly reduces the potential for catastrophic failure such as edge-cord separation or loss and/or other premature failure of the belt thereby.

It is believed that this shift of strain through the high modulus adhesive rubber member and into a significantly lower modulus undercord results in a decrease in the tendency of multi-V-ribbed belts incorporating such materials to exhibit premature edgecord failure under high load conditions, as reflected in constant tension durability testing further described below. Instead, these belts exhibit more favorable undercord cracking at failure after prolonged operation, which, as indicated above and unlike edgecord failure, typically allows for remedial measures prior to catastrophic failures.

In addition, while not intending to be limited to any particular theory, it is presently believed that the high modulus adhesive rubber members of the present invention exhibit reduced heat build-up under prolonged high load durability testing compared to similar materials exhibiting complex moduli within conventional low ranges. Under a constant load, it is presently believed that a high modulus, hysteretic elastomer may actually produce less heat build-up than a low modulus stock exhibiting low hysteresis.

The high modulus adhesive rubber member of the present invention may be formed by combining, utilizing known rubber compounding techniques, any suitable or desirable base elastomer or combinations of one or more elastomers, any number of which are well known in the art, and including those set forth above for the elastomeric belt body portion 12, with suitable and/or conventional rubber composition additives, provided the composition is compatible with the intended application and the surrounding belt materials, and exhibits adequate adhesion to the latter. Such materials may generally comprise a base elastomer or elastomers, fillers, plasticizers, vulcanization agents or curatives and accelerators, etc., in amounts which may be derived in accordance with the present invention from those conventionally employed to establish the desired complex- or tensile modulus level as described above and in further detail below.

Preferred elastomers for utilization in the adhesive rubber member composition in accordance with an embodiment of the present invention include any conventional and/or suitable natural or synthetic elastomer, Including but not limited to ethylene-alpha-olefin elastomer. Preferred elastomers based on their current commercial availability include such ethylene alpha olefin elastomers as EPM or EPDM, EOM and EBM. For contributing good tack and good processing characteristics however, lower ethylene content (e.g., 40% to 65%, and more preferably of from about 50% to 60% by weight) ethylene alpha olefin elastomers may be beneficially employed. Particularly preferred ethylene alpha olefin elastomers in the practice of the present invention include those available under the trademarks NORDEL 1040 (previously available from DuPont Chemical Co.); ROYALTHERM 1411 (by Uniroyal Chemical Co.), ENGAGE 8150 and ENGAGE 8180 (EOM by DuPont Dow Elastomers) and VISTALON 606 and VISTALON 404 (by (Uniroyal Chemical Co). Ethylene-alpha-olefin elastomers exhibiting viscosities of 60 and 40 Mooney respectively may moreover be blended with a low molecular weight, low Mooney viscosity EPDM material, e.g., TRILENE CP80 (by Uniroyal Chemical Co.) or NORDEL IP 4520 (by DuPont Dow Chemical Co.) for providing an additional viscous component useful in promoting processing, mill handling and tack.

According to an embodiment of the present invention, the base elastomer is mixed with conventional rubber composition additives, e.g., fillers, vulcanization- or curing agents and accelerators; scorch retarders, etc., as provided in accordance with an embodiment of the present invention to achieve a composition having at least one of complex modulus and tensile modulus at 10% elongation within claimed ranges. Suitable fillers may be reinforcing, non-reinforcing, semi-reinforcing or combinations of the foregoing, which may include carbon blacks; silica; clay; talc, etc. In a preferred embodiment, at least a portion of the filler loading of the elastomer composition of the adhesive rubber member is a silica filler, which may also be used in combination with a coupling agent. In the present context, the term, "coupling agent" is used to denote a material that provides, promotes or contributes to chemical reaction between itself and another material, or between two other materials, through covalent bonding. This combination has been found to build modulus more efficiently than conventional carbon black fillers and furthermore allows for improved adhesion to the tensile member, to an extent not readily achievable with carbon black fillers. In particular, one may graft the silica onto rubber using a silane coupling agent, for example in amounts of up to about 30 phr, preferably of from about 0.5 to about 15 phr, and most preferably of from about 1 to about 10 phr, to further enhance the polymer network. In particular, such fillers may be employed in the practice of the present invention in amounts of from about 1 to about 200 parts per hundred weight of elastomer ("phr"); more preferably of from about 10 to about 150 phr, and most preferably of from about 25 to 100 phr.

Silica fillers beneficially employed in the subject invention moreover include those described commercially as "highly dispersible" varieties, execmplified by that material available from J. M. Huber Corporation under the trademark ZEOPOL, and including ZEOPOL 8745. When used, either alone or in combination with one or more other fillers, they may beneficially be employed in amounts of from about 1 to about 200 phr; more preferably from about 15 to about 100 phr; and most preferably from about 40 to about 70 phr.

Silica may moreover be further incorporated in the adhesive rubber composition of the present invention by means of the base polymer, e.g., ROYALTHERM 1411 by Uniroyal Chemical Co. The composition furthermore preferably includes a rubber adhesive adjuvant or coagent. In the present context, the terms, "rubber adhesive adjuvant" (or "adjuvant") and "rubber adhesive coagent" (or "coagent") area used interchangeably to denote a material that provides, promotes or contributes to adhesion between itself and one or more other materials, or between two or more such materials, through mechanical- and/or chemical bonding, the latter of which may include any type, including but not limited to covalent boding, ionic bonding, dipole interactions such as hydrogen bonding, etc.

Suitable adjuvants include those materials generally classified as Type I coagent compounds, exemplified by polar, relatively low molecular weight materials such as acrylates, methacrylates and certain bismaleimides; and those materials generally classified as Type II coagent compounds, exemplified by the low polarity, network-building maleated polybutadienes. Further examples, characteristics and suitable usage amounts of Type I and Type II coagents are described in the paper, "1,2 Polybutadiene Coagents for Improved Elastomer Properties" by R. E. Drake et al., Ricon Resins, Inc., as presented at the American Chemical Society Rubber Division Meeting n November 1992.

For utilization with the ethylene-alpha-olefin elastomers of a preferred embodiment of the invention, such coagent may preferably be in the form of one or more metal salt of alpha-beta unsaturated organic acid, as set forth for example in U.S. Pat. No. 5,610,217 the contents of which with regard to such salts and their beneficial use in such systems is herein specifically incorporated by reference.

In particular, zinc dimethacrylate and/or zinc diacrylate may be utilized as such coagent in amounts of from about 1 to about 50 phr, more preferably of from about 5 to about 30 phr, and most preferably of from about 10 to about 25 phr. As noted above, these materials further contribute to the intrinsic adhesiveness of the composition, and furthermore increase the overall cross-link density of the polymer upon curing with peroxide or related agents as described further below, through ionic crosslinking, as is now well known in the art.

The composition may furthermore optionally include discontinuous fibers, which may also be utilized to build, i.e., to increase, the modulus of the resulting composition in accordance with the present invention. The appropriate amounts of the various types of conventionally employed fibers sufficient for raising the composition's modulus to within the claimed range, in combination with one or more of the foregoing composition constituents, would be readily discernable by the skilled practitioner, but may be in the range of from about 0.01 to about 75 phr. Fibers that may optionally be included in the adhesive rubber composition 18 according to this embodiment of the present invention may be of any conventional or suitable material or form, including for example materials such as cotton, polyester, aramid, carbon, polyimide, polyvinyl alcohol, nylon and fiberglass; and in forms including staple- or chopped fibers, and pulped- or flocked fibers. The fibers may moreover be treated with sizing, an adhesive, or other conventional and/or suitable fiber treatments as are well known in the art. In a preferred embodiment of the present invention such as that set forth in Table 1 below as Example 2, at least a substantial number of the fibers in the adhesive rubber member are formed and arranged to lie in the run- or longitudinal direction of the belt. According to this embodiment, preliminary experimentation suggests that improved high load durability may result, e.g., by approximately one hundred times, in 3-ribbed multi-V-ribbed belts, compared to substantially similar belts wherein only the fiber loading of adhesive rubber member is omitted. It is believed that this improvement is attributable to the higher with-grain modulus of the fiber-loaded rubber stock compared to the non-fiber loaded material. This is believed to reduce the amount of shear in the fiber-loaded adhesive rubber member under an applied load, and thus the stress in the rubber, thereby leading to increased life observed on the high load durability test. In those V- or multi-v-ribbed belt constructions of embodiments of the present invention wherein a separate fiber-loaded undercord (i.e., belt body portion) is employed distinct from a so- fiber-loaded adhesive rubber member, the skilled practitioner would readily recognize that the respective directions of orientation of the fibers in the adhesive rubber member and in the undercord would generally be transverse one another, with the fibers in the adhesive rubber member layer(s) being oriented generally in the longitudinal direction of the belt, and the fibers in the undercord being generally in the direction transverse thereto. This would particularly be the case when the fiber-loaded undercord is bannered (as opposed, e.g., to molded belt constructions).

The adhesive rubber composition of the present invention may be cured using any curative or vulcanization system suitable for use with the base elastomer, including those employing sulfur, peroxide or other free-radical inducing material, and combinations thereof, in cure-effective amounts. In the present context, the terms, "curative" and "vulcanizer", both in these and their various forms, are used interchangeably to denote a material that provides, promotes or contributes to cross-linking of polymer molecules. In a preferred embodiment the high modulus adhesive rubber composition is cured with a cure-effective amount of a curative selected from organic peroxide, organic peroxide blended with from about 0.01 to about 1.0 phr of sulfur, ionizing radiation, and combinations of two or more of the foregoing. For utilization with the ethylene-alpha-olefin elastomers in accordance with a preferred embodiment of the invention, peroxide curing is most preferred, and with regard to the use of that particular peroxide utilized throughout the following illustrative examples or peroxides having the same or comparable activity, at levels of from about 0.5 to 10 phr; more preferably of from 1 to 9 phr; and most preferably of from about 2 to about 8 phr.

Further conventional rubber additives may be employed, e.g., scorch retarders such as zinc oxide; plasticizers and oils; vulcanization accelerators and antioxidant systems, all of any suitable and/or conventional type and in amounts conventionally employed for such purpose.

EXAMPLES

In each of the following examples and comparative examples, elastomer processing was carried out as follows. All of the constituents for a given formulation, except for the elastomer, the curatives and the antioxidant constituents, were added together in a 1A Banbury mixer having an inner volume of 16,500 cm$^3$ with mixing at 30 rpm. After approximately one minute, the elastomer was added in each case, and the mixture was blended until a temperature of 310° F. (154° C.) was reached as indicated by a thermocouple located within the ram of the mixer, or for a maximum time of 8 minutes. In a second pass, the mixture was further mixed to a thermocouple-indicated temperature of 310° F. (154° C.) or a maximum of 6 minutes. In a third pass, the antioxidant constituents and curatives were added, and the mixture was further mixed to a thermocouple-indicated temperature of approximately 235° F. (113° C.) (or a maximum temperature of 265° F. (129° C.)).

TABLE 1

|  | Example 1 (phr) | Example 2 (phr) | Example 3 (phr) | Example 4 (phr) |
|---|---|---|---|---|
| EPDM | 100.00[1] | 100.00[1] | 100.00[1] | 100.00[2] |
| Silica[4] | 66.82 | 66.82 | 66.82 | 60.00 |
| Carbon Black | 0 | 0 | 0 | 0 |
| Fiber | 0 | 5.30[5] | 0 | 0 |
| Zinc dimethacrylate[6] | 14.17 | 14.17 | 18.41 | 15.00 |
| Curative[7] | 3.75 | 3.75 | 6.68 | 4.00 |
| Zinc stearate USP | 1.50 | 1.50 | 1.50 | 1.50 |
| Zinc oxide 318-T | 5.00 | 5.00 | 5.00 | 5.00 |

In Table 1:
[1]ROYALTHERM 1411, silica-modified EPDM by Uniroyal Chemical Co.
[2]80:20 blend of VISTALON 606 and TRILENE CP80, both by Uniroyal Chemical Co.
[4]HI-SIL 190G (precipitated hydrated amorphous silica) by PPG
[5]3 mm TWARON formerly by Enka (now by Teijin)
[6]SR 708 by Sartomer Co.
[7]α-α-bis(t-butylperoxy) diisopropylbenzene on Burgess KE clay, by Hercules, Inc.

In addition to the constituents listed above in Table 1, Examples 1–4 furthermore comprised as non-essential but optional constituents an antioxidant system comprising 1.0 phr of zinc 2-mercaptotolylimidazol (VANOX ZMTI by R. T. Vanderbilt), 1.0 phr of 4,4'-bis (α-al, dimethylbenzyl) diphenylamine (NAUGARD 445 by Uniroyal Chemical Co.) and 0.5 phr of sterically hindered diphenolic (ETHANOX 702 by Ethyl Corp.). While not essential to the practice of the present invention, each of Examples 1–4 included 1.5 phr of zinc stearate and 5.00 phr of zinc oxide as indicated, which were added to the compositions to provide basic conditions within the composition for improved peroxide utilization and a neutralizing base for reaction with any free methacrylic acid that could otherwise have formed.

TABLE 2

|  | Example 1 | Example 2 | Example 3 | Example 4 |
|---|---|---|---|---|
| G* (kPa) | 43695 | 45539 | 42446 | 17365 |
|  | 42308 | 42323 |  |  |
|  | 37144 |  |  |  |
| G' (kPa) | 43595 | 45461 | 42392 | 17320 |
|  | 42210 | 42231 |  |  |
|  | 37029 |  |  |  |
| G" (kPa) | 2950 | 2665 | 2129 | 1254 |
|  | 2886 | 2797 |  |  |
|  | 2929 |  |  |  |
| J (1/Mpa) | 0.00155 | 0.00129 | 0.00118 | 0.00416 |
|  | 0.00161 | 0.00156 |  |  |
|  | 0.00212 |  |  |  |
| Tan δ | 0.068 | 0.059 | 0.050 | 0.072 |
|  | 0.068 | 0.066 |  |  |
|  | 0.079 |  |  |  |
| M10 @ 125° C. | 420 psi (2.90 MPa) | 536 psi* (3.70 MPa) | 381 psi (2.63 MPa) | 240 psi (1.66 MPa) |
| S' at 177° C. | 55.2 lbin (6.23 NM) | 64.3 lbin (7.26 NM) | 74.3 lbin (8.39 NM) | 42.8 lbin (4.83 NM) |
| Eb at 125° C. (%) | 197.4 | 58.7* | 102.8 | 320.9 |
| Durometer |  |  |  |  |
| Shore A | 97 | 99 | 97 | 83 |
| Shore D | 43 | 48 | 54 | (no data) |

*M10 and Eb measured cross grain for Example 2 composition, containing discontinuous fibers. (With-grain measurement Eb was 6.3%; no M10 measurement possible with grain.)

For the G*, G', G", J and Tan δ data set forth in Table 2 and in the table s following, analyses were accomplished utilizing a dynamic mechanical rheological testing system exemplified by Rubber Process Analyzer, Model No. 2000 by Monsanto Corporation of St. Louis, Mo. The data were obtained at 175° C., at a frequency of 2000 cpm and a strain of 0.09 degrees. In Table 2, "G*" represents complex modulus; "G'" represents elastic modulus; "G''" represents inelastic modulus, "J" represents loss compliance, and Tan δ is the ratio of inelastic modulus (G") to elastic modulus (G'). A normal shear stress-strain test, such as that employed in the above instance as represented in the data of Table 2, measures complex modulus G*, which is a vector sum of elastic modulus (G') and inelastic, or viscous modulus G", and may be represented as follows:

$$G^* = G' + JG'' = G'(1 + J \tan \delta\, G)$$

where tan δ (or the "loss factor") is a measurement, directly, of the damping of any rubber material, and inversely, of its transmissibility.[1]

[1] Dasgupta "Vibration Isilators and Mounts", p 697, Bhowmick et al., *Rubber Products Manufacturing Technology*, Marcel Dekker, Inc., New York. 1994. pp 687–704

In all instances reported herein, tensile properties were measured in accordance with ASTM D412. For the tensile modulus at 10% elongation ("M10"), the modulus of the (unaged) cured samples at 125° C., 10% elongation and at a cross-head speed of 6 in./min (15.24 cm/min) are reported in Table 2. For the percent elongation at break data ("Eb"), ASTM D412 was followed (without aging) and the elongation at break of the cured samples at 125° C. is reported in the tables. For determining the hardness of the various examples and comparative examples, Shore A and, where provided, Shore D Durometer measurements of the unaged samples were taken, at roughly room temperature.

Preliminary high load durability testing in 3-ribbed multi-v-ribbed belts suggests that the incidence of edgecord failure, and particularly premature edgecord failure, is significantly reduced in those belts having EPDM-based undercord (substantially similar to that described in aforementioned U.S. Pat. No. 5,610,217) and incorporating as their adhesive rubber member a high modulus composition as described in Table 1 as Example 2, compared to substantially similar belts incorporating as their adhesive rubber member a conventional low modulus composition. At the conclusion of the tests, those belts having high modulus adhesive rubber members in accordance with the subject invention were observed to exhibit undercord cracks, and not edgecord separation or failure.

Table 3 sets forth the formulae for adhesive rubber compositions according to the present invention incorporated in three-ribbed multi-v-ribbed belts, which were subjected to high load, constant tension durability testing.

TABLE 3

|  | Example 3 (phr) | Example 4 (phr) | Example 5 (Comparative) (phr) | Example 6 (phr) |
|---|---|---|---|---|
| EPDM | 100.00[3] | 100.00[1] | 100.00[2] | 100.00[3] |
| Silica[4] | 66.82 | 60.00 | 60.00 | 66.82 |
| Zinc dimethacrylate[5] | 18.41 | 15.00 | 15.00 | 14.17 |
| Curative[6] | 6.68 | 4.00 | 4.00 | 3.75 |
| Zinc stearate USP | 1.50 | 1.50 | 1.50 | 1.50 |
| Zinc oxide 318-T | 5.00 | 5.00 | 5.00 | 5.00 |

In Table 3:
[1]80:20 blend of VISTALON 606 and TRILENE CP80, both by Uniroyal Chemical Co.
[2]70:30 blend of VISTALON 606 and TRILENE CP80, both by Uniroyal Chemical Co.
[3]ROYALTHERM 1411 by Uniroyal Chemical Co.
[4]HI-SIL 190G (precipitated hydrated amorphous silica) by PPG
[5]SR 708 by Sartomer Co.
[6]α-α-bis(t-butylperoxy) diisopropylbenzene on Burgess KE clay, by Hercules, Inc.

In addition to the constituents listed above in Table 3, Examples 3, 4 and 6 and Comparative Example 5 furthermore comprised as non-essential but optional constituents an antioxidant system comprising 1.0 phr of zinc 2-mercapto-tolylimidazol (VANOX ZMTI by R. T. Vanderbilt), 1.0 phr of 4,4'-bis (α-al, dimethylbenzyl) diphenylamine (NAUGARD 445 by Uniroyal Chemical Co.) and 0.5 phr of sterically hindered diphenolic (ETHANOX 702 by Ethyl Corp.). While not essential to the practice of the present invention, each of Examples 3, 4 and 6 and Comparative Example 5 included 1.5 phr of zinc stearate and 5.00 phr of zinc oxide as indicated, which were added to the compositions to improve peroxide utilization and to provide a neutralizing base to react with any methacrylic acid that would form within the composition.

Each of the compositions described above in Table 3 was formed substantially in accordance with the relevant description provided above pertaining to Table 1, and was utilized to form the adhesive rubber member of a 3-ribbed multi-v-ribbed belt as described above in relation to FIG. 1, measuring 43.84 inches (112 cm) in length and approximately 1.067 cm in top width. In each case, the undercord, i.e., elastomeric belt body portion, was a fiber-loaded EPDM-based composition similar to that set forth above in aforementioned U.S. Pat. No. 5,610,217, (as Belt 1 of Table 6 thereof), the contents of which, with regard to the belt constructions described therein are herein specifically incorporated by reference. The tensile member for each of the belts was a polyethylene terephthalate cord adhered to the adhesive rubber member by means of a cord treatment comprising an isocyanate primer followed by a vinyl pyridine styrene butadiene rubber latex. The belts moreover included a rubber-skim coated tire cord reinforcing fabric ply on their back surface, i.e., on the surface opposite the sheave-engaging surface as described above for FIG. 1.

To form the belts for the analyses described herein, one or more plies of the various belt composite structure constituents, i.e., uncured undercord stock, skim-coated reinforcing fabric, tensile cord and uncured adhesive rubber composition, were applied in the appropriate order to a belt-building drum, such that the double-spiral configured tensile cord was disposed between two plies of adhesive rubber composition. For Example 4 and Comparative Example 5, each ply of the respective uncured adhesive rubber composition measured 0.010 gauge, while for Example 3 and 6, each ply of the uncured adhesive rubber composition measured 0.008 gauge in thickness. Each so-built uncured belt sleeve was then profiled to a 0.090 rideout, and exposed to sufficient temperature over a sufficient period of time to achieve at least 95% cure, as indicated by no appreciable peroxide signature as analyzed via dynamic scanning colorimetry ("DSC").

Figure 5:
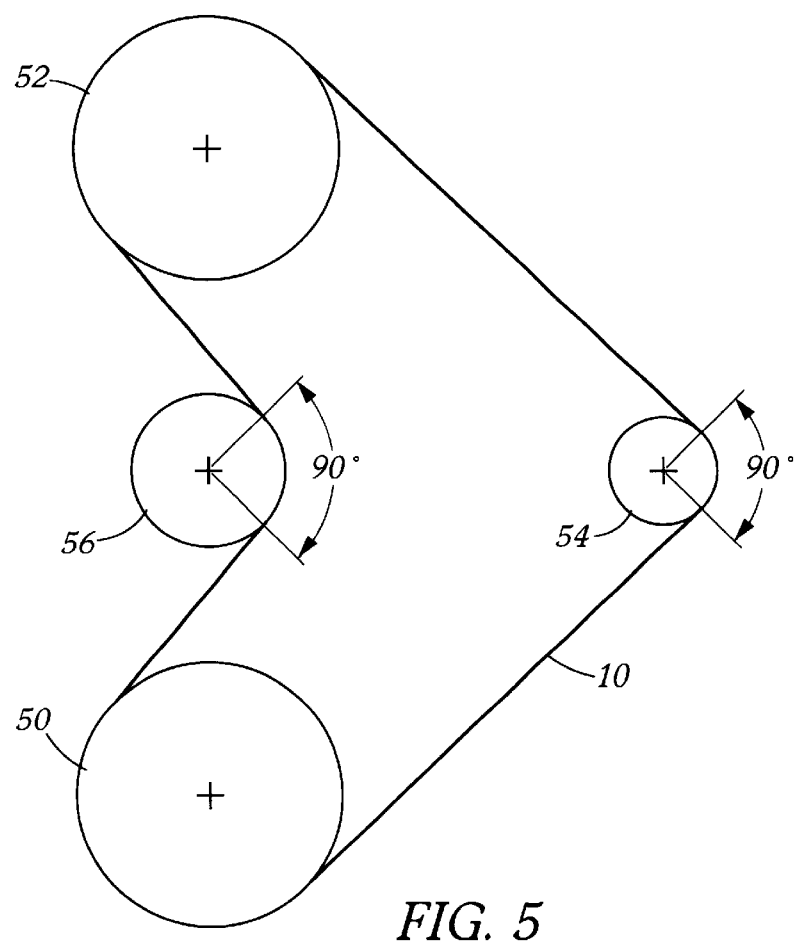
FIG. 5 is a schematic illustration of the high temperature, constant tension load capacity test configuration utilized in describing an embodiment of the present invention.

To determine load-carrying capability at high tension and high temperature as set forth below in Table 4, each of the belts was trained about a driver pulley 50 and a driven pulley 52, each measuring 4.75 inches (12 cm) in diameter: a second driven pulley 54 measuring 1.75 inches (21 cm) in diameter, and a backside idler 56 measuring 3.00 inches (7.6 cm) in diameter. The pulleys were arranged in the configuration illustrated schematically in FIG. 5. The driver pulley was operated at 4900 rpm, and 180.06 in-lbs. of torque was applied at the large driven pulley for an effective horsepower of 14. Constant, horizontal tension of 140 lbs. was applied at the smaller driven pulley. The test was conducted at 175° F. (80° C.) to a point of failure, as evidenced by edge cord separation, separation of ribs, or the appearance of a number of undercord cracks equal to one more than the number of belt ribs.

For the elastic torque (S') and the complex torque (S*) values where reported in Tables 2, 4 and 5, samples of each of the compositions for the respective Examples and Comparative Examples were analyzed using rotorless linear shear, according to ASTM D 5289. Each of the samples was exposed to a temperature of 350° F. (177° C.) for thirty minutes and thereby cured within a Monsanto® Oscillating Disc Rheometer (MDR 2000E), at 0.5° arc and 1.7±0.1 Hz. Complex torque for a given rubber composition relates to complex modulus according to the following:

$G^* \alpha S^*/\text{Strain}.$

TABLE 4

|  | Example 3 | Example 4 | Example 5 (Comparative) | Example 6 |
|---|---|---|---|---|
| Load capacity (hours) | 1228.4 — | 115.6** 171.4** 152.0** | 54.6** 25.7** 61.9** | 1290.5 1072.6 — |

TABLE 4-continued

|  | Example 3 | Example 4 | Example 5 (Comparative) | Example 6 |
|---|---|---|---|---|
| G* (kPa) At 175° C., 2000.0 cpm; 0.09° strain | 42446 | 17385 | — | 37240 |
| S* (lb.-in.) 0.5° arc, 1.7 ± 0.1 Hz | 76.80 | 43.36 | 36.88 | 58.27 |
| M10 at 125° C. | 381 psi (2.63 MPa) | 240 psi (1.66 MPa) | 120 psi (0.83 MPa) | 360 psi (2.48 MPa) |
| S' at 177° C. | 74.3 lbin (8.39 NM) | 42.8 lbin (4.83 NM) | 36.5 lbin (4.12 NM) | 56.2 lbin (6.35 NM) |
| Eb at 125° C. (%) | 102.8 | 320.9 | 441.4 | 278.4 |
| Durometer |  |  |  |  |
| Shore A | 97 | 83 | 84 | 97 |
| Shore D | 54 | (no data) | (no data) | 52 |

**Exhibited edgecord separation or other belt failure believed to be attributable to edge-cord separation.

The data set forth in Table 4 illustrates the improved high load durability exhibited by the belts of the present invention, particularly of the Example 3 and Example 6 belts. While all of the Example 4 and Comparative Example 5 belts eventually exhibited some degree of edgecord separation or other failures that are believed to be attributable to edge-cord separation, none of the Example 3 or Example 6 belts exhibited any separation or loss of edgecord, even after the 1000 to more than 1200 hours on this highly rigorous test. This is particularly notable since, as reflected in tensile modulus (M10), elastic torque (S') and complex torque (S*) data, the Example 4 and Comparative Example 5 belts exhibited far lower modulus than either of the Example 3 or Example 6 compositions. Moreover, one can see that the number of hours on test increased generally in proportion to the complex torque (and hence, complex modulus) of the respective formulations.

It is believed that any endless belt construction would benefit by the incorporation of the high modulus elastomer compositions described herein adjacent, i.e., at least partially in contact with one or more of the adhesive-treated (or untreated) tensile cord, e.g., as the adhesive rubber member of the belts in accordance with the present invention; particularly those where edgecord failure concerns are prominent, e.g., high load and/or high strain applications. The improved durability results set forth above in Table 4 suggest that a higher load per rib of the multi-V-ribbed belts could be endured by the belts of the present invention compared to conventional belts, suggesting that one could potentially decrease the number of belt ribs for a given application, or could use the same number of ribs on a belt for higher load application by thus practicing this embodiment of the present invention.

In contrast to the conventionally held view, it is moreover presently believed that high tear strength is not necessarily required in the high modulus adhesive rubber members of the present invention. While adhesion gums of the prior art require this property in order to resist the effects of strain concentration at the tensile cord-adhesion gum interface (e.g., as typically manifested as cord pullout); strain is conversely not concentrated at this interface in belts utilizing the high modulus adhesive rubber members of the present invention, due to the cured adhesive rubber composition's ability to transmit at least a significant portion of strain away from the tensile cord-adhesive rubber member interface and into the underlying undercord elastomer as described above, thus high tear resistance is not required of these materials. Hence, for example low cross-link density materials are not necessary in the practice of the present invention, and high cross-link density materials can successfully be used.

The present invention moreover offers benefit in the area of belts intended to be utilized without tensioners, i.e., belts incorporating relatively low modulus, e.g., certain polyamides such as nylon 6/6, tensile cord which accommodate sufficient elongation, e.g., up to 6% or more, to allow for the belt to be stretched about the pulleys onto the drive and thereby impart tension to the belt. The high modulus adhesive rubber member of the present invention maintains the cord in place and prevents it from migrating through the relatively low modulus undercord as the belt is stretched in place about the pulleys. The invention moreover finds particular utility in the construction of power transmission belts in generator starter applications, wherein the need for high load capability (and/or high load capability per belt rib to allow for narrower belts) is particularly pronounced.

While the formulas set forth above in Tables 1, 3 and 5 utilize EPDM or ethylene-alpha-olefin elastomer-based materials, and would therefore be ideal for use with similarly-based undercord materials, its is anticipated that high modulus adhesive rubber member compositions may similarly be formulated based on other elastomers, by increasing one or more of the fillers, and principally of the silica fillers, the adjuvants/coagents (zinc methacrylate or the like) and/or by adding or increasing the amount of fiber loading thereof, to the extent necessary to provide in the adhesive rubber member a complex modulus as described above of 15,000 kPa or greater or a tensile modulus at 10% elongation and at 125° C. of at least 250 psi (1.724 MPa).

The following additional examples set forth further non-limiting embodiments of the present invention, intended to illustrate various non-exclusive combinations of constituents that have been formed and analyzed. In each case, in addition to the constituents listed in Table 5 below, each of the Examples and Comparative Examples furthermore comprised as non-essential but optional constituents an antioxidant system comprising 1.0 phr of zinc 2-mercaptotolylimidazol (VANOX ZMTI by R. T. Vanderbilt), 1.0 phr of 4,4'-bis (α-al, dimethylbenzyl) diphenylamine (NAUGARD 445 by Uniroyal Chemical Co.) and 0.5 phr of sterically hindered diphenolic (ETHANOX 702 by Ethyl Corp.). While not essential to the practice of the present invention, each of the Comparative Examples 7 and 8 and Example-9 furthermore included as non-essential, but optional constituents 1.5 phr of zinc stearate and 5.00 phr of zinc oxide as indicated, which were added to the compositions to provide basic conditions within the composition for improved peroxide utilization and a neutralizing base for reaction with any free methacrylic acid that could otherwise have formed.

TABLE 5

|  | Example 7 (Comparative) | Example 8 (Comparative) | Example 9 |
|---|---|---|---|
| Ethylene-alpha-olefin (phr) | 100[1] | 100[1] | 100[2] |
| Silica (phr) | 40 | 33.18 | 60 |
| ZDMA (phr) | 5 | 10 | 15 |
| Curative (phr) | 4 | 5 | 5 |
| Coupling agent (phr) | 0 | 0 | 8.6 |
| Fiber (phr) | 0 | 0 | 5.3 |
| G* (kPa) | 8886.80 | 11319.00 | 29,367 28,660 28,703 |

TABLE 5-continued

|  | Example 7 (Comparative) | Example 8 (Comparative) | Example 9 |
|---|---|---|---|
| M10 at 125° C. | 143.2 psi (0.99 MPa) | 178.8 psi (1.23 MPa) | 469.8 psi*** (3.24 MPa) |
| S' at 177° C. | 22.76 lbin (2.57 NM) | 37.32 lbin (4.22 NM) | 77.5 lbin (8.76 NM) |
| Eb at 125° C. (initial) | 477.8 | 280.8 | 152.3*** |
| Durometer |  |  |  |
| Shore A | 81 | 84 | (no data) |
| Shore D | (no data) | (no data) | (no data) |

***Eb and M10 reported values for Example 9 sample, containing discontinuous fibers, were from cross-grain measurements. (With-grain measurement for original Eb at 125° C. was 74.5%, and for M10 was 848.8 psi (5.86 MPa))
In Table 5:
Ethylene alpha olefin = 1 Royaltherm 1411, silica-modified EPDM by Uniroyal Chemical Co.; or, 2 Engage 8180 ethylene octene elastomer by DuPont Dow Elastomers
Silica = Hi-Sil 190G (precipitated hydrated amorphous silica) by PPG
ZDMA = Sr-708 by Sartomer Co.
Curative = Vul-Cup 40KE α-α-bis(t-butylperoxy) diisopropylbenzene on Burgess KE clay, by Hercules, Inc
Coupling Agent = A174 DLC silane by Harwick/Natrochem
Fiber = 3 mm Technora by Teijin The Comparative Example 7 and 8 formulas and data of Table 5, particularly in view of the Example 3 and 6 formulas provided above, illustrate the manner in which the amount of filler, in this case, a silica filler, and the amount of coagent, in this case zinc dimethacrylate ("ZDMA"), can be manipulated for a given elastomer to achieve the properties set forth above and in the appended claims. The Example 9 formula and data provided in Table 5 illustrate the utilization of a silane coupling agent, in the illustrated case within a fiber-loaded EOM elastomer composition, to achieve high modulus levels within the practice of this embodiment of the present invention.

While the formulas set forth above in Tables 1, 3 and 5 utilize EPDM or ethylene-alpha-olefin elastomer-based materials, and would therefore be ideal for use with similarly-based undercord materials, its is anticipated that high modulus elastomer compositions may similarly be formulated based on other elastomers, by increasing the amount of one or more of the fillers, and principally of the silica filler(s), and/or the adjuvant(s)/coagent(s) (zinc methacrylate or the like), and/or the coupling agent(s) and/or by adding or increasing the amount of fiber loading thereof, to the extent necessary to provide in the adhesive rubber member (or other composition adjacent to the tensile member) a complex modulus as described above of 15,000 kPa or greater or a tensile modulus at 10% elongation, a cross-head speed of 6 in/min (15.24 cm/min) and at 125 C of at least 250 psi.

To form the belts of the present invention any conventional and/or suitable method may be employed, such as for example optionally placing one or more plies of a rubberized fabric (when used), unvulcanized elastomer, tensile cord, one or more layers of adhesive rubber member, and additional unvulcanized elastomer onto a belt-building drum; vulcanizing the assembly; and cutting and/or skiving or otherwise profiling appropriate individual multi-V-ribbed or V-belt profiles. In a preferred embodiment, at least one ply of the high modulus adhesive rubber is applied above the tensile cord and at least one ply of the high modulus adhesive rubber is applied below the tensile cord, such that the cord is sandwiched or disposed between layers of the adhesive rubber member. However, a single ply of the high modulus adhesive rubber member composition may alternatively be applied either above or below the tensile cord, which may be beneficial in some circumstances. Alternatively, a belt in accordance with the present invention may comprise as any elastomer constituent adjacent to or at least partially in contact with the tensile cord the high modulus adhesive rubber composition as described herein, so that for example, no separate adhesive rubber member layer exists between the tensile cord and the belt undercord, and instead the high modulus rubber composition itself constitutes the sole or major belt elastomer constituent.

The skilled practitioner would readily appreciate suitable dimensions and proportions of the various belt constituents for a given application. In a preferred embodiment pertaining to automotive accessory drive applications, 3-ribbed multi-v-ribbed belts as described above in the descriptions pertaining to Tables 3 and 4 include one ply of the adhesive rubber composition layer above the tensile cord, and one ply below the tensile cord. In this embodiment, each ply prior to vulcanization preferably measures from about 0.002 to about 0.02 ga ($7.9 \times 10^5$ mm to $7.9 \times 10^4$ mm); more preferably from about 0.004 to about 0.015 ga ($15.7 \times 10^5$ mm to $5.9 \times 10^4$ mm); most preferably of from about 0.006 to about 0.012 ga ($23.6 \times 10^5$ mm to $4.72 \times 10^4$ mm).

It is envisioned that the present invention would moreover find beneficial utility in synchronous belts, as described above in FIG. 3. For such applications, belts would likely be constructed according to any conventional belt-building process provided the high modulus composition described herein is incorporated into the belt structure in a manner so as to fully or at least partially encapsulate the tensile cord. As a non-limiting example, the synchronous belt pre-form method would likely accommodate incorporation of the high modulus adhesive rubber members of the present invention. This method is characterized by first pre-forming the teeth of the belt, and then plying up additional belt layers including the adhesive rubber member as is well known in the art, then vulcanizing the assembly cutting, etc.

Although the present invention has been described in detail for the purpose of illustration, it is to be understood that such detail is solely for that purpose and that variations can be made therein by one skilled in the art without departing from the spirit or scope of the present invention except as it may be limited by the appended claims. The invention disclosed herein may suitably be practiced in the absence of any element not specifically disclosed herein.

What is claimed is:

1. An endless belt selected from a V-belt and a multi-v-ribbed belt, comprising a longitudinally extending tensile member embedded in a cured elastomeric belt body, wherein at least a portion of said tensile member is in contact with a cured elastomer composition, and characterized in that the cured elastomer composition exhibits at least one of a complex modulus measured at a temperature of 175° C., a frequency of 2000 cpm and a strain of 0.09 degrees, of at least about 15,000 kPa; and a tensile modulus at 10% elongation and 125° C. of at least about 250 psi.

2. The belt according to claim 1 wherein the cured elastomer composition possesses a complex modulus measured at a temperature of 175° C., a frequency of 2000 cpm and a strain of 0.09 degrees, of from 25,000 to 100,000 kPa.

3. The belt according to claim 1 wherein the cured elastomer composition possesses a complex modulus measured at a temperature of 175° C., a frequency of 2000 cpm and a strain of 0.09 degrees, of from 35,000 to 75,000 kPa.

4. The belt according to claim 1 wherein the cured elastomer composition possesses a complex modulus measured at a temperature of 175° C., a frequency of 2000 cpm and a strain of 0.09 degrees, of from 40,000 to 60,000 kPa.

5. The belt according to claim 1, wherein the cured elastomer composition possesses a tensile modulus at 10% elongation and 125° C. in the range of from 300 to 5000 psi.

6. The belt according to claim 1, wherein the cured elastomer composition possesses a tensile modulus at 10% elongation and 125° C. in the range of from 250 to 3000 psi.

7. The belt of claim 1 wherein said cured elastomer composition exhibits a complex modulus measured at a temperature of 175° C., a frequency of 2000 cpm and a strain of 0.09 degrees, of at least about 15,000 kPa; and a tensile modulus at 10% elongation and 125° C. of at least 250 psi.

8. The belt of claim 1 wherein said tensile member accommodates sufficient elongation to impart tension to the belt in a position trained about at least two pulleys.

9. A belt drive comprising at least two pulleys and having a belt according to claim 1 trained around said pulleys.

10. The belt drive of claim 9 in a form of a generator starter belt drive.

11. The belt of claim 1 wherein said cured elastomer composition is in a form of an adhesive rubber member, said belt further comprises a cured elastomeric belt body portion, and at least a portion of said tensile member is bonded on at least one side to said adhesive rubber member to form a tensile section embedded in said elastomeric belt body portion.

12. The belt according to claim 11, wherein at least one of the elastomeric belt body portion and the adhesive rubber member is formed of a composition comprising an elastomer selected from:
    a) ethylene alpha olefin elastomer;
    b) polychloroprene elastomer;
    c) Acrylonitrile butadiene elastomer;
    d) Hydrogenated Acrylonitrile butadiene elastomer;
    e) Styrene butadiene elastomer;
    f) Alkylated chlorosulfonated polyethylene;
    g) Epichlorohydrin;
    h) Polybutadiene elastomer
    i) Natural rubber;
    j) silicone rubber; and
    k) a mixture of at least any two of the foregoing.

13. The belt according to claim 12 wherein at least one of said cured elastomeric belt body portion composition and said adhesive rubber member composition further comprises at least one of a filler in an amount of from about 1 to about 200 phr; an adhesive coagent in an amount of from about 1 to about 50 phr; and a fiber reinforcement in an amount of from about 0.01 to about 75 phr.

14. The belt according to claim 13 wherein said filler is one selected from:
    a) silica;
    b) carbon black;
    c) talc;
    d) clay; and
    e) a combination of any two or more of the foregoing.

15. The belt according to claim 12 wherein at least one of said cured elastomeric belt body portion composition and said adhesive rubber member composition further comprises at least one of a filler in an amount of from 1 to 200 phr; an adhesive coagent in an amount of from 1 to 50 phr; and a fiber reinforcement in an amount of from 0.01 to 75 phr.

16. The belt according to claim 11, wherein at least one of the cured elastomeric belt body portion and the adhesive rubber member comprises an ethylene alpha olefin elastomer composition.

17. The belt according to claim 16 wherein said at least one of said cured elastomeric belt body portion composition and said adhesive rubber member composition is cured with a cure-effective amount of a curative selected from:
    a) organic peroxide
    b) said organic peroxide blended with from about 0.01 to about 1.0 phr of sulfur;
    c) ionizing radiation; and
    d) a combination of any two or more of the foregoing.

18. The belt according to claim 16 wherein said at least one of said cured elastomeric belt body portion composition and said adhesive rubber member composition further comprises a coupling agent.

19. The belt according to claim 18 wherein said coupling agent comprises silane, and is present in said composition in an amount of up to 30 phr.

20. A method of forming an endless belt, selected from a V-belt and a multi-v-ribbed belt, comprising the steps of:
    a) applying in any order;
       (i) a layer comprising an uncured belt body portion elastomer composition,
       (ii) an uncured adhesive rubber composition, and
       (iii) a tensile member to a belt-building drum to form an uncured sub-assembly; and
    b) curing the sub-assembly with a cure-effective amount of curative;
    c) and characterized in that the method further comprises the step performed prior to the step of applying said compositions to said belt-building drum, of forming at least one of said uncured elastomer composition and said uncured adhesive rubber composition to exhibit in a cured state at least one of a complex modulus, measured at 175° C., a frequency of 2000.0 cpm and 0.09 degrees strain, of at least 15,000 kPa; or a tensile modulus, measured at 10% elongation and 125° C., of at least 250 psi.

21. The method of claim 20 further comprising the steps of applying at least a first layer of said uncured adhesive rubber composition below said tensile member, and applying a second layer of said uncured adhesive rubber composition above said tensile member, such that said tensile member is disposed between said layers of uncured adhesive rubber composition prior to said curing step.

22. An endless belt selected from a V-belt and a multi-v-ribbed belt, comprising a longitudinally extending tensile member embedded in a cured elastomeric belt body, wherein at least a portion of said tensile member is in contact with a cured elastomer composition, and characterized in that the cured elastomer composition exhibits at least one of a complex modulus measured at a temperature of 175° C., a frequency of 2000 cpm and a strain of 0.09 degrees, of at least 15,000 kPa; and a tensile modulus at 10% elongation and 125° C. of at least 250 psi.

* * * * *